United States Patent [19]

Ralph

[11] Patent Number: 5,148,896
[45] Date of Patent: Sep. 22, 1992

[54] HIGH PRESSURE HYDROPNEUMATIC SHOCK ABSORBER

[75] Inventor: Harry C. Ralph, Kirkland, Wash.

[73] Assignee: The Boeing Company, Seattle, Wash.

[21] Appl. No.: 724,121

[22] Filed: Jul. 1, 1991

[51] Int. Cl.⁵ .............................. F16F 9/43; F16F 9/44
[52] U.S. Cl. ...................... 188/314; 188/315; 188/322.21; 267/64.15; 267/64.26; 267/64.28; 244/104 FP
[58] Field of Search .............. 188/314, 322.21, 315; 267/64.15, 64.26, 64.28; 244/104 FP

[56] References Cited

U.S. PATENT DOCUMENTS

| | | | |
|---|---|---|---|
| 2,308,404 | 1/1943 | Thornhill | 267/64.26 X |
| 3,197,191 | 7/1965 | Axthammer | 267/64 |
| 3,227,435 | 1/1966 | Greer | 267/64.28 X |
| 3,957,259 | 5/1976 | Peddinghaus | 267/64 |
| 4,114,866 | 9/1978 | Kato | 267/64 |
| 4,131,139 | 12/1978 | Tanabe | 141/4 |
| 4,139,182 | 2/1979 | Nagase et al. | 267/64.15 X |
| 4,360,192 | 11/1982 | Ishida | 267/64.28 |
| 4,483,377 | 11/1984 | Cubalchini | 141/349 |
| 4,583,346 | 4/1986 | Kameda | 53/431 |
| 4,732,244 | 3/1988 | Verkuylen | 188/314 X |
| 4,921,227 | 5/1990 | Fukumura et al. | 188/314 X |
| 4,973,854 | 11/1990 | Hummel | 188/314 X |

FOREIGN PATENT DOCUMENTS

| | | | |
|---|---|---|---|
| 45-39375 | 12/1970 | Japan . | |
| 1-88734 | 7/1989 | Japan | 188/314 |
| 634040 | 11/1978 | U.S.S.R. | 267/64.26 |
| 2170294 | 7/1986 | United Kingdom . | |

*Primary Examiner*—George E. A. Halvosa
*Attorney, Agent, or Firm*—Glenn D. Bellamy

[57] ABSTRACT

A high pressure hydropneumatic shock absorber (10) includes a cylinder (12) with a piston (16) slidably positioned within the cylinder (12). The piston (16) and cylinder (12) are configured as a telescopic suspension unit. The piston (16) defines a first variable volume chamber (28) within the cylinder (12) and is filled with a working liquid. A reservoir (44) includes an interior movable barrier wall (62) defining first (60) and second (64) separated variable volume reservoir chambers. The first reservoir chamber (60) is filled with working liquid and the second reservoir chamber (64) is filled with a working gas. A flow-controlling damper valve (58) communicates the first cylinder chamber (28) with the first reservoir chamber (60). Relative telescopic movement of the piston (16) and cylinder (12) cause damped flow of the working liquid from the first cylinder chamber (28) to the first reservoir chamber (60) and cause responsive movement of the barrier wall (62) to allow expansion of the first reservoir chamber (60) and corresponding reduction of the second reservoir chamber (64), thereby compressing the working gas. A method of charging a hydropneumatic shock absorber (10) having a telescopic piston cylinder unit (12, 16) comprises the steps of providing a first variable volume chamber (28) defined by the piston (16) within the cylinder (12). A flow-controlling damper valve (58) communicating the first chamber (28) with a reservoir (44) is also provided. The first chamber (28) and reservoir (44) are filled with a predetermined volume of a working liquid and a predetermined volume of a working gas at a predetermined pressure. Further working fluid is added, thereby compressing the working gas, until the working liquid and working gas reach a predetermined desired static pressure at a predetermine relative position of the piston 16 to the cylinder 12.

1 Claim, 6 Drawing Sheets

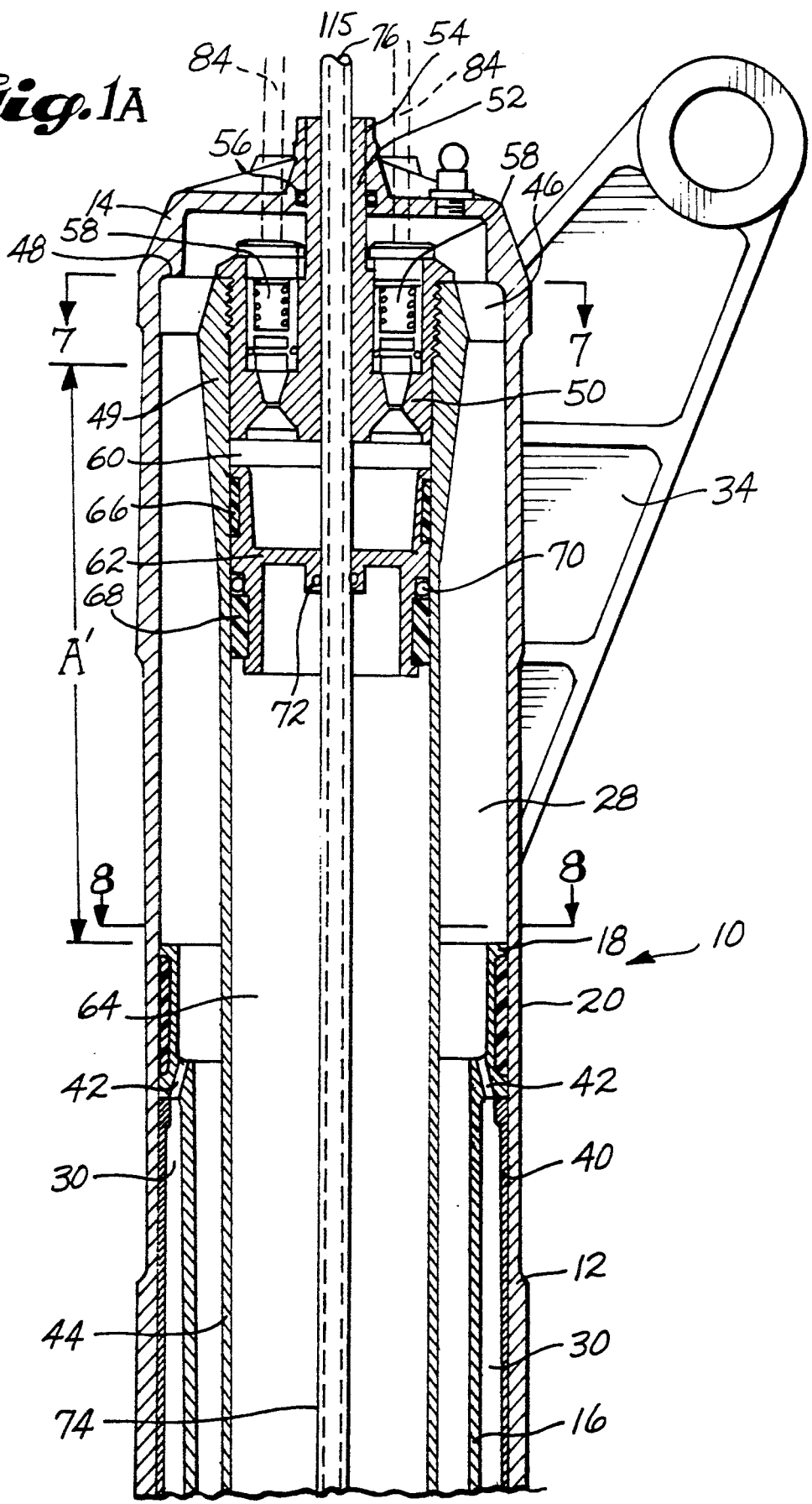

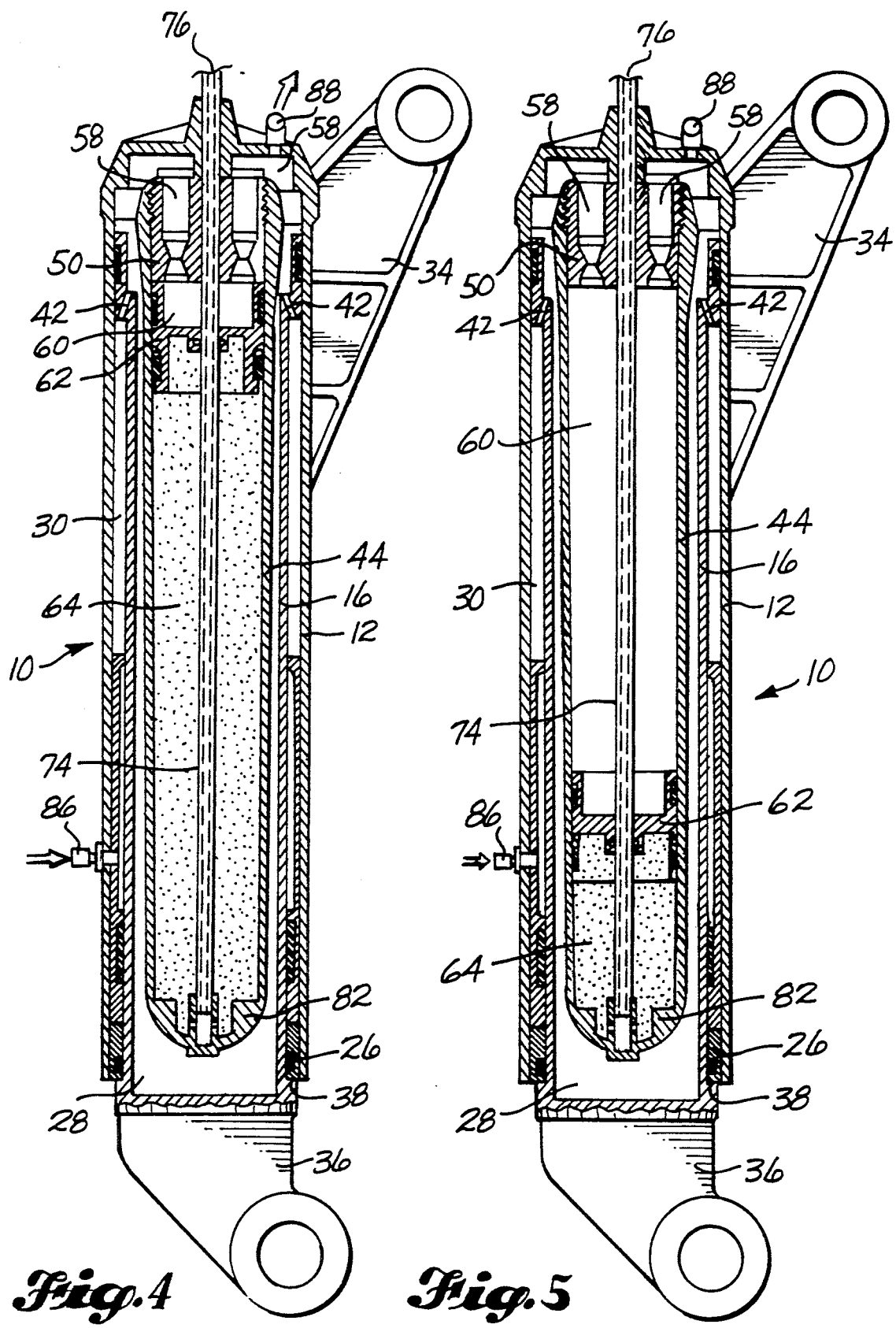

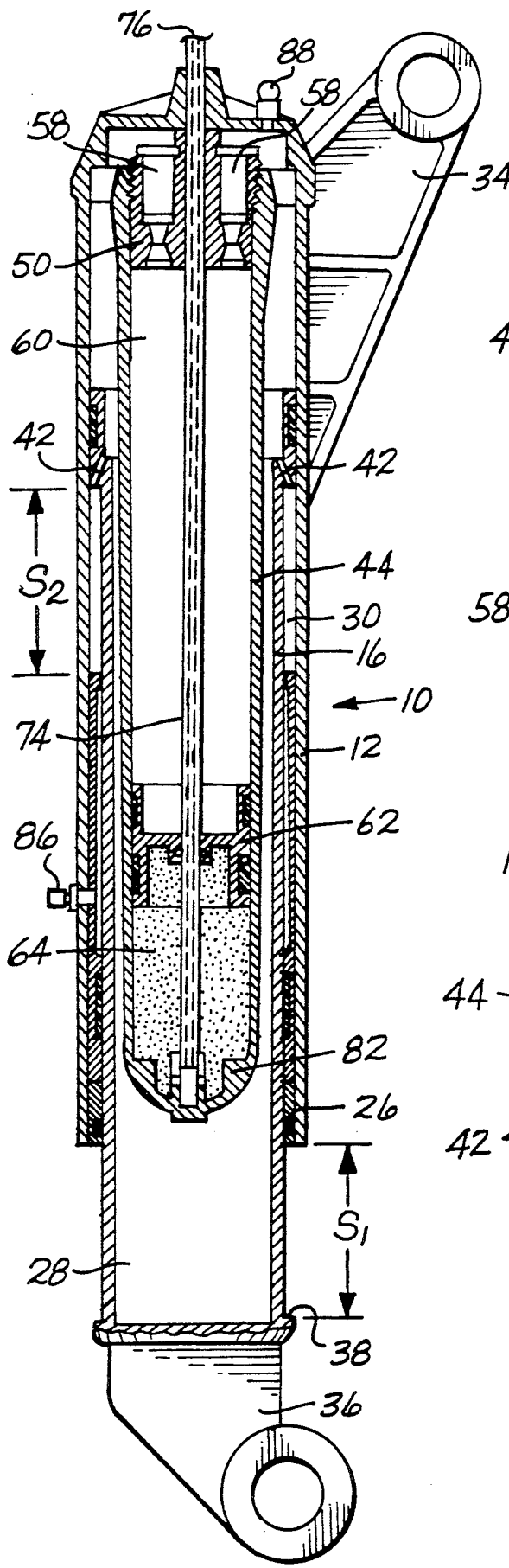
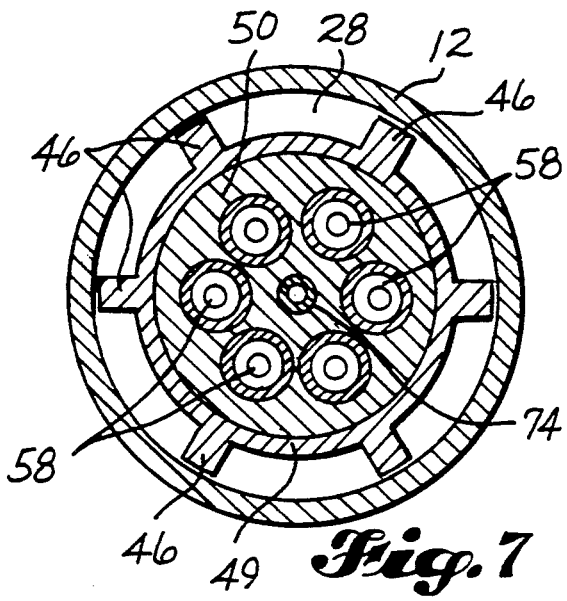
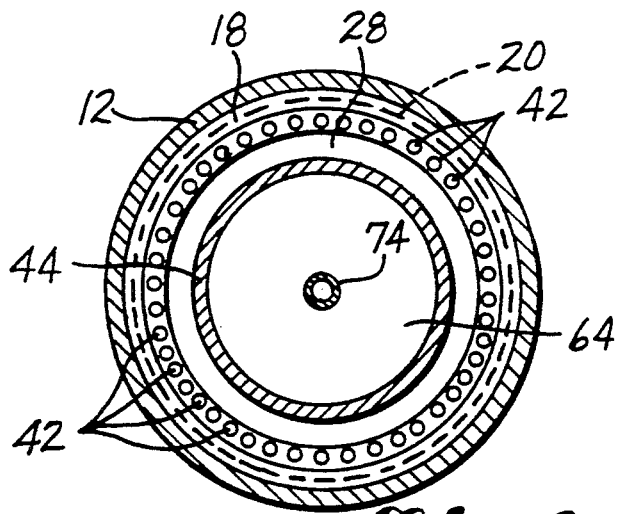

HIGH PRESSURE HYDROPNEUMATIC SHOCK ABSORBER

TECHNICAL FIELD

This invention relates to a high pressure hydropneumatic shock absorber, especially for use in an aircraft landing gear strut, which includes a gas and oil separating piston and to a method of charging such a shock absorber to a high static pressure to increase load-carrying capabilities without corresponding increase in size.

BACKGROUND ART

Current technology is allowing the design of larger aircraft than ever before This increase in size results in a corresponding increase in weight and loads which must be carried by its landing gear.

The landing gear on most commercial aircraft includes an "oleo" strut in the form of a nitrogen/oil charged shock absorber. A typical oleo may use a metering rod form of damping with no separation between the nitrogen and oil. Under extreme load, the nitrogen could be compressed, at least theoretically, to zero volume. The high pressure developed by extreme loading can cause the nitrogen to go into chemical solution with the oil. Under certain circumstances, this could result in changes in orifice co-efficients and damping qualities. Additionally, there is a reluctance for the entrapped nitrogen to evacuate the oil as the pressure is reduced. This could result in a temporary variation in static height of the suspension member and the aircraft or other vehicle it supports. When some of the nitrogen in an oleo strut has been compressed into solution and the oleo pressure is released to atmosphere for servicing, nitrogen will effervesce from the oil.

The static load imposed on a landing gear oleo is reacted by the internal pressure distributed over the area of the oleo's piston. Because of the above-described increase in aircraft weight, the area of the piston has had to be correspondingly increased in order to carry the increased load without increasing the static pressure within the oleo cylinder.

Previously, the cylinder of an oleo was charged by filling it with a predetermined volume of oil and then applying pressurized nitrogen from industrial gas bottles on site. In order to service the landing gear while installed in the aircraft, and without jacking the aircraft, nitrogen must be available under sufficient pressure that it will sustain the weight of that aircraft. The maximum specified pressure in standard industrial nitrogen bottles is about 2,400 pounds per square inch (psi) However, for design purposes, and to allow for growth, a maximum pressure of 1,800 psi is used as a design specification to optimize the piston rod diameter. This limitation of static pressure available on site requires an increase of piston diameter as the load requirement increases. Consequently, the outer fitting of the landing gear also increases in diameter, almost proportionally, and the resulting weight and volume of the oleo may be reflected in other fittings of the gear also.

SUMMARY OF THE INVENTION

The present invention provides a hydropneumatic shock absorber having a cylinder with a piston slidably positioned therein to be configured as a telescopic suspension unit. The piston defines a first variable volume chamber within the cylinder and is filled with a working liquid. A fixed volume reservoir is provided which includes an interior movable barrier wall defining first and second separated variable volume reservoir chambers therein. The first reservoir chamber is filled with working liquid and the second reservoir chamber is filled with a working gas. A flow-controlling damper valve communicates the first cylinder chamber with the first reservoir chamber. Relative telescopic movement of the piston and cylinder cause damped flow of the working liquid from the first cylinder chamber to the first reservoir chamber and cause responsive movement of the barrier wall within the reservoir to allow expansion of the first reservoir chamber. This results in corresponding reduction in volume of the second reservoir chamber, thereby compressing the working gas.

A method of charging a hydropneumatic shock absorber having a telescopic piston cylinder unit is also provided. This method includes the steps of providing a first variable volume chamber defined by a piston within a cylinder and providing a flow-controlling damper valve communicating the first chamber with a reservoir. The first chamber and reservoir are filled with a predetermined volume of a working liquid and a predetermined volume of a working gas at a predetermined pressure. Then, working liquid is further added, thereby compressing the working gas, until the liquid and gas reach a predetermined desired static pressure.

The problem of dissolution of the working gas, preferably nitrogen, into the working liquid, preferably oil, is eliminated by placement of a freely-moving separator piston in the reservoir between the liquid and gas. In this manner, the working gas may be compressed to a theoretical zero volume without an interface between the working liquid and gas. Static pressures in excess of that supplied by standard industrial nitrogen bottles can be achieved according to the present invention by pumping oil at high pressure, preferably in the range of 2,500 to 5,000 psi which is easily achieved on site, into the oleo cylinder and thereby further compressing the gas to the desired static pressure.

Another aspect of the invention is that the reservoir may be located within the first chamber of the cylinder. In this manner, the reservoir may be supported by a head portion of the cylinder. This positioning of the reservoir is especially suitable for allowing the damper valve to be adjustably controlled externally of the cylinder. The cylinder may also include a second chamber defined by the piston. Working liquid communicates between the first and second cylinder chambers through a passage in the piston.

The method of the present invention allows the shock absorber to be fully collapsed for servicing in place, such as in an aircraft landing gear strut, and then charged without jacking of the aircraft The method may be initiated with the shock absorber fully collapsed and charged With a sufficient volume of working liquid and gas to extend the shock absorber to a predetermined static position. The present method allows the shock absorber to first be charged with a predetermined volume and pressure of working gas, then filled with the working liquid to the predetermined volume and pressure as residual air is bled or exhausted through an upper cylinder port.

BRIEF DESCRIPTION OF THE DRAWINGS

Like reference numerals are used to indicate like parts throughout the various figures of the drawing, wherein:

FIGS. 1a and 1b together are a longitudinal sectional view of a high pressure hydropneumatic shook absorber according to the preferred embodiment of the invention, shown in a fully-extended position;

FIG. 4 is a similar sectional view showing the oil chambers filled to a pressure less than or equal to the initial gas pressure;

FIG. 5 is a similar sectional view showing the oil chambers and gas chamber pressurized to a predetermined static pressure;

FIG. 6 is a similar sectional view showing oil and gas chambers pressurized to static pressure and oil chambers filled to correct static position;

FIG. 7 is a cross-sectional view taken substantially along line 7—7 of FIG. 1;

FIG. 8 is a cross-sectional view taken substantially along line 8—8 of FIG. 1.

BEST MODE FOR CARRYING OUT THE INVENTION

Figure 1B:
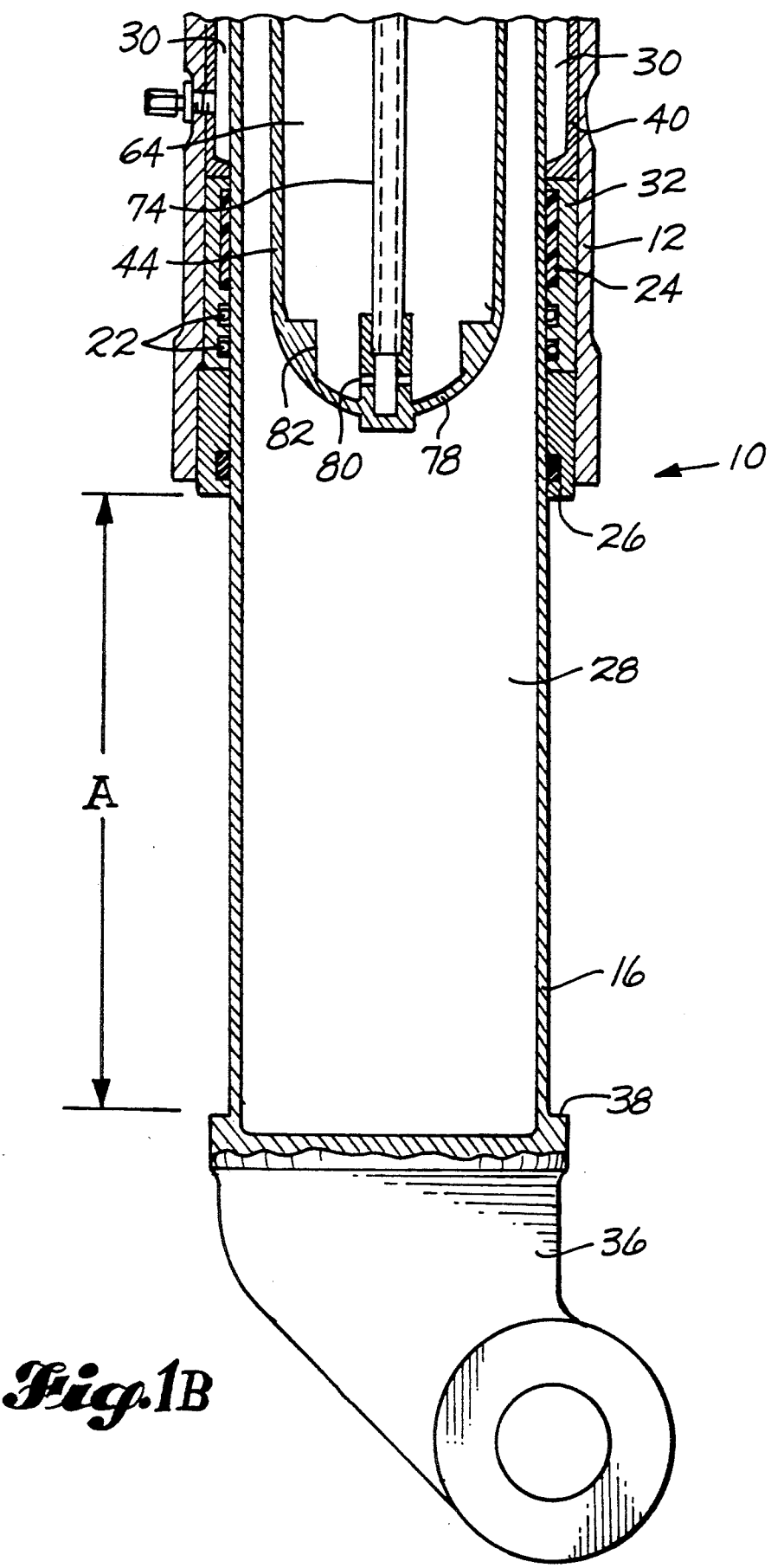

Referring to the various figures of the drawing, and first to FIGS. 1a and 1b, therein is shown at 10 a telescopic hydropneumatic shook absorber strut according to the preferred embodiment of the invention. The strut 10 could be used as a part of most any suspension unit, especially the main or nose landing gear of an aircraft Generally, the strut 10 includes a cylinder 12 with a closed head portion 14 at its upper end. Telescopically positioned within the cylinder 12 is a piston 16. The piston 16 of the preferred embodiment has a very long and deep head or face such that the piston 16 acts substantially as a piston rod also. The piston 16 seals against the inner surface of the cylinder 12 at an upper end portion 18 and with a ring bearing 20. The cylinder 12 is sealed around the piston/piston rod with double O-ring seals 22 and includes a first ring bearing 24 and annular wiper bearing 26. The cylinder 12 and piston 16 together define two variable volume chambers. The first chamber 28 is defined within the cylinder 12 between the cylinder's upper head 14 and the piston 16. The second chamber 30 is defined behind the piston 16 and enclosed by the lower head portion 32 of the cylinder 12 which carries the ring bearing 24 and O-ring seals 22.

The cylinder 12 is mounted as a suspension unit by a cylinder mounting flange 34 The piston/piston rod 16 is attached in the suspension system by a piston-mounting flange 36.

FIGS. 1a and 1b show the shock absorber in a fully-extended position The stroke of the piston 16 within the cylinder 12 is defined and limited by contact of an annular stop shoulder 38 at the piston's flange end 36 against the wiping bearing 26 of the cylinder 12. The stroke is also limited by an annular spacer member 40 which is positioned within the cylinder 12 between the upper end portion 18 of the piston 16 and the lower head portion 32 of the cylinder 12. The stroke length is shown as A. The stroke of the piston upper end portion 18 toward the cylinder head 14 is an equal distance indicated as A'.

The piston head or upper end portion 18 includes a plurality of flow-limiting valves or ports 42 which communicate the first chamber 28 with the second chamber 30. As will be explained in greater detail later, the chambers 28, 30 of the oleo are, in use, filled with hydraulic oil. Linear compression of the piston 16 within the cylinder 12 causes a reduction in volume of the first chamber 28 and transmittal of a corresponding increase in pressure to the oil in that chamber 28. This movement also causes an increase in volume of the second chamber 30 Oil in the first chamber 28 is allowed to flow through the ports 42 into the second chamber 30. When compressive force on the piston-cylinder unit is removed and the cylinder 12 and piston 16 are then extended relative to one another, volume of the second chamber 30 decreases and volume of the first chamber 28 increases. This causes a corresponding reverse flow of oil through the ports 42 from the second chamber 30 to the first chamber 28. Oil flow may be restricted equally or unequally in both directions through the ports 42. In this manner, linear movement of the piston 16 within the cylinder 12 is damped The annular arrangement of these ports 42 may be seen also in FIG. 8.

The present invention also includes a secondary bottle or reservoir 44. In preferred form, this reservoir 44 is located within the cylinder 12 and is supported by the upper cylinder head 14. For example, also making reference to FIG. 6, the reservoir 44 casing includes at its upper end flanges 46 which are sized and spaced to center the reservoir 44 within the cylinder 12 and to abut an annular shoulder 48 of the cylinder head 14 in a manner which allows substantially unrestricted oil flow around the upper end 49 of the reservoir 44 casing. The upper end 49 of the reservoir is closed by an end plug or head 50. The head 50 is threadingly engaged into the casing of the reservoir 44. The head 50 includes a stem portion 52 which extends through the cylinder head 14 and may be threadingly engaged by an external nut 54. The nut 54 holds the entire reservoir 44 assembly in place with the flange portions 46 bearing against the annular shoulder 48. An O-ring seal 56 may be used to provide a pressure seal between the stem portion 52 and the cylinder head 14. The reservoir head 50 holds a plurality of adjustable-orifice valve means 58 which will be described in further detail later. These valves 58 communicate the first chamber 28 of the cylinder 12 with a first interior chamber 60 of the reservoir 44.

The reservoir bottle 44 is divided into two interior chambers by a sliding separator piston 62. The separator piston 62 separates the above-mentioned oil chamber 60 from a second, gas chamber 64. In preferred form, the separator piston includes first and second bearings 66, 68 and first and second O-ring seals 70, 72. The first seal 70 seals the separator piston 62 against the inner wall of the reservoir casing 44. The second seal 72 seals the separator piston 62 against a central fill tube 74. The fill tube 74 allows a working gas, preferably nitrogen, to be introduced into the reservoir's second chamber 64 from a port 76 external of the strut 10. Because the separator piston 62 is free to move along substantially the entire length of the reservoir 44, the fill tube 74 must extend all the way to the lower end portion 78 of the reservoir 44. In preferred form, the end portion 78 supports the fill tube 74 and include ducts 80 for introduction of the working gas into the second chamber 64. The end portion 78 also includes stop members 82 against which the separator piston 62 may be supported when it is at an extreme lower position.

The separator piston 62 operates as a physical separation or barrier between the hydraulic oil and gas within the strut 10. The separator piston 62 prevents any interface between these fluids, thereby preventing dissolution of the working gas into the working liquid when subjected to extreme pressure. It also separates the reservoir 44 into two variable volume chambers 60, 64. As oil enters the first chamber 60, that chamber is expanded and the second chamber 62 is reduced in volume, thereby compressing the gas. Because these chambers 60, 64 are separated by a physical barrier, the gas chamber can be located in a lower level of the strut 10 relative to the expanding oil chamber 60 Without the separator piston 62, the working gas would tend to collect in the uppermost region within the oleo strut 10. In such a situation, extra care would have to be taken in the oleo's design that damping valves or orifices, such as at 42 and 58, are positioned to port only the correct working fluid, as the working liquid and working gas have quite different orifice co-efficients.

Specific structure of the damper valve means 58 does not comprise any portion of the present invention The valves 58 could include a fixed orifice or a variable orifice which reacts to a change in pressure applied to the oil within the oleo strut. Such pressure-adjusted valves are common and may be used as a part of the present invention or selected by a person of ordinary skill in the art. Alternatively, the presently-disclosed oleo strut structure would allow for the installation of damper valves of any various design such that their performance (orifice size) can be adjusted from the exterior of the strut 10. Referring to FIG. 1a, this may be accomplished because of the unique position of the valves 58 and reservoir 44 within the cylinder 12. Mechanical or electrical controls can communicate with the valves 58 through the cylinder head 14 as illustrated at 84. The strut 10 may be made fully active and/or adaptive by supplying a suitable control means (not shown) for adjusting the valves 58 in response to change in load or pressure, or in anticipation of loads or, for example, runway terrain, as may be desired for use in an aircraft landing gear strut.

In use, the oleo strut 10 is charged with pressurized oil and gas, preferably nitrogen, according to the method which will be described in detail later The cylinder chambers 28, 30 and first reservoir chamber 60 is filled with pressurized oil. The second reservoir chamber 64 is filled with pressurized gas. The strut 10 shown in FIGS. 1a and 1b is shown in a fully-extended, unloaded position In a static, loaded position, the cylinder 12 and piston 16 would be intermediately positioned relative to one another, as shown, for example, in FIG. 6.

When the strut 12 is subjected to dynamic compressive load, the oil in the cylinder's first chamber 28 is compressed and thereby under increased or high pressure. The oil in the cylinder's second chamber 30 and reservoir's first chamber 60 become relatively low pressure chambers into which the oil is ported through ports 42 and valves 58, respectively. The limitation of flow by the ports 42 and valves 58 damp the linear movement of the cylinder 12 and piston 16. As oil enters the reservoir's first chamber 60, the influx of oil expands that chamber 60 in volume in order to maintain a relatively constant or equalized pressure. Accordingly the separator piston 62 is moved downwardly, increasing the volume of the first chamber 60 and decreasing the volume of the second, gas chamber 64. The gas in chamber 64 is compressed in volume, thereby proportionally increasing its pressure. As previously described, the working gas may theoretically be compressed to zero volume. However, because the separator piston 62 separates the interface between the working gas and working liquid, even under extreme pressure conditions, the gas cannot dissolve into the oil.

When compressive force on the strut 10 is removed, the pressure differential between chamber 28 and chambers 60 and 30 are reversed or equalized When the previously-described pressure differential is removed, the working gas in chamber 64 will expand in volume to decrease its pressure, thereby forcing oil from tho reservoir chamber 60 back through the damping valves 58 and into the cylinder chamber 28. Also, oil which was ported into the second cylinder chamber 30 will return through ports 42 into the first chamber 28. The oil movement and gas expansion will tend to seek an equilibrium of pressure toward a predetermined static pressure. Oil flow is damped in both directions of flow, thereby damping movement of the cylinder 12 and piston 16 relative to one another and damping bounce in the suspension system into which the strut 10 is incorporated.

Figure 9:
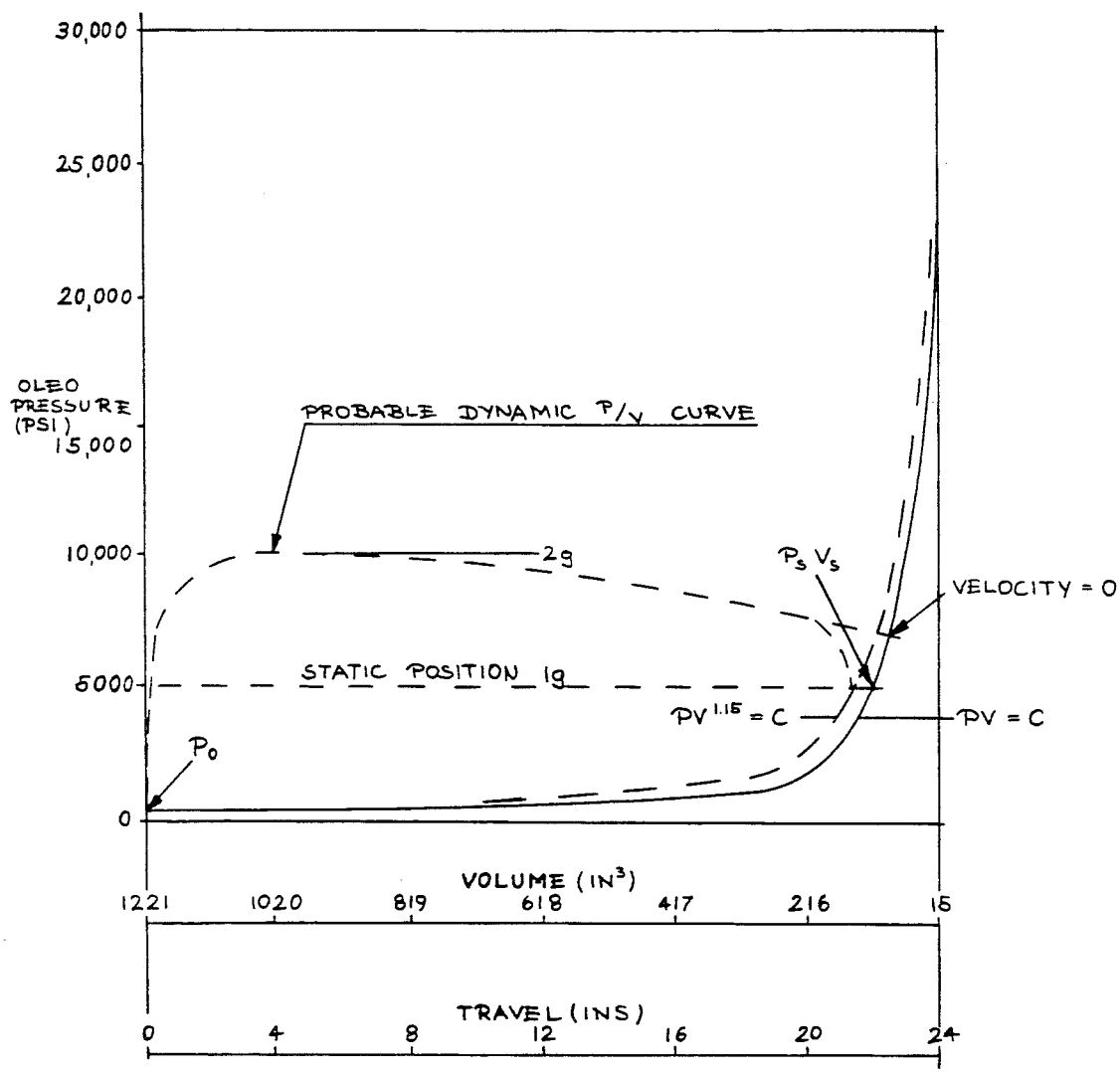
FIG. 9 is a graph indicating the relationship of internal gas pressure and volume during compression of the shock absorber under both static and dynamic conditions.

Referring to FIG. 9, therein is shown a graph which illustrates a typical load/stroke curve for a high pressure hydropneumatic shock absorber according to the present invention. The solid line represents a pressure/volume curve for the working gas in the strut under static load. As an example, the working gas of the strut may be charged by the high pressure oil to a pressure of approximately 5,000 psi at a static volume of approximately 115.5 cubic inches and with a piston extension of approximately 22 inches. This static position on the curve is shown as $P_s V_s$.

When all load is removed from the shock absorber, such as in an aircraft landing gear while the aircraft is in flight, the static pressure, gas volume, and piston travel is shown as $P_o$. A probable dynamic pressure/volume curve is shown as the dashed line indicating a very rapid increase in pressure, slowly decreasing as the piston travels and the working gas is compressed. The point at which this dynamic line would cross the static line would represent a velocity factor of zero. In practice, however, the dynamic pressure/volume curve drops off toward the static pressure/volume and position point. Due to a variety of extrinsic factors such as oil compressibility, cylinder stretching, and heat, the static curve would be shifted as shown by the dashed line labeled $PV^{1.15} = C$. As the shock absorber recovers according to well-known factors, the static pressure/volume constant would shift accordingly to that shown by the solid line, labelled $PV = C$.

The presently-disclosed hydropneumatic shock absorber structure may be modified in many ways to meet the particular needs of a given application without departing from the spirit and scope of the present invention. For example, the reservoir in which working gas is compressed as oil is ported from the cylinder need not be positioned within the cylinder. It could, of course, be positioned external of the cylinder with suitable conduit and damping valves positioned therebetween. Although usually considered to be desirable, an operable hydropneumatic shock absorber may be constructed without utilizing the second chamber 30 of the cylinder 12 and the flow-restricting ports 42.

In the preferred embodiment, the reservoir casing 44 is supported only at its upper end 49 and does not perform any mechanical load-bearing function of the strut 10. In this form, the reservoir casing 44 is isolated from lateral loads placed on the cylinder 12 and piston 16. When the cylinder 12 and piston 16 are subject to such loads, the lower end 78 of the reservoir 44 may approach contact with the interior of the piston chamber wall This allows the reservoir casing 44 to be constructed of lighter materials. Alternatively, if it is desired that the reservoir casing 44 carry lateral loads of the strut 10, a suitable bearing means (not shown) could be situated at or near the lower end 78 of the reservoir 44 between it and the inner wall of the piston 16. Any such bearing should be constructed so as not to restrict flow of oil past it in the chamber 28.

The present invention includes a novel method of charging a high pressure hydropneumatic shock absorber such as that previously described and illustrated. A shook absorber, especially when used in a commercial aircraft landing gear, must be capable of being serviced and charged on site or in the field. In such an installation, it is important that the strut be capable of being serviced without jacking the aircraft or vehicle.

Figures 2, 3:
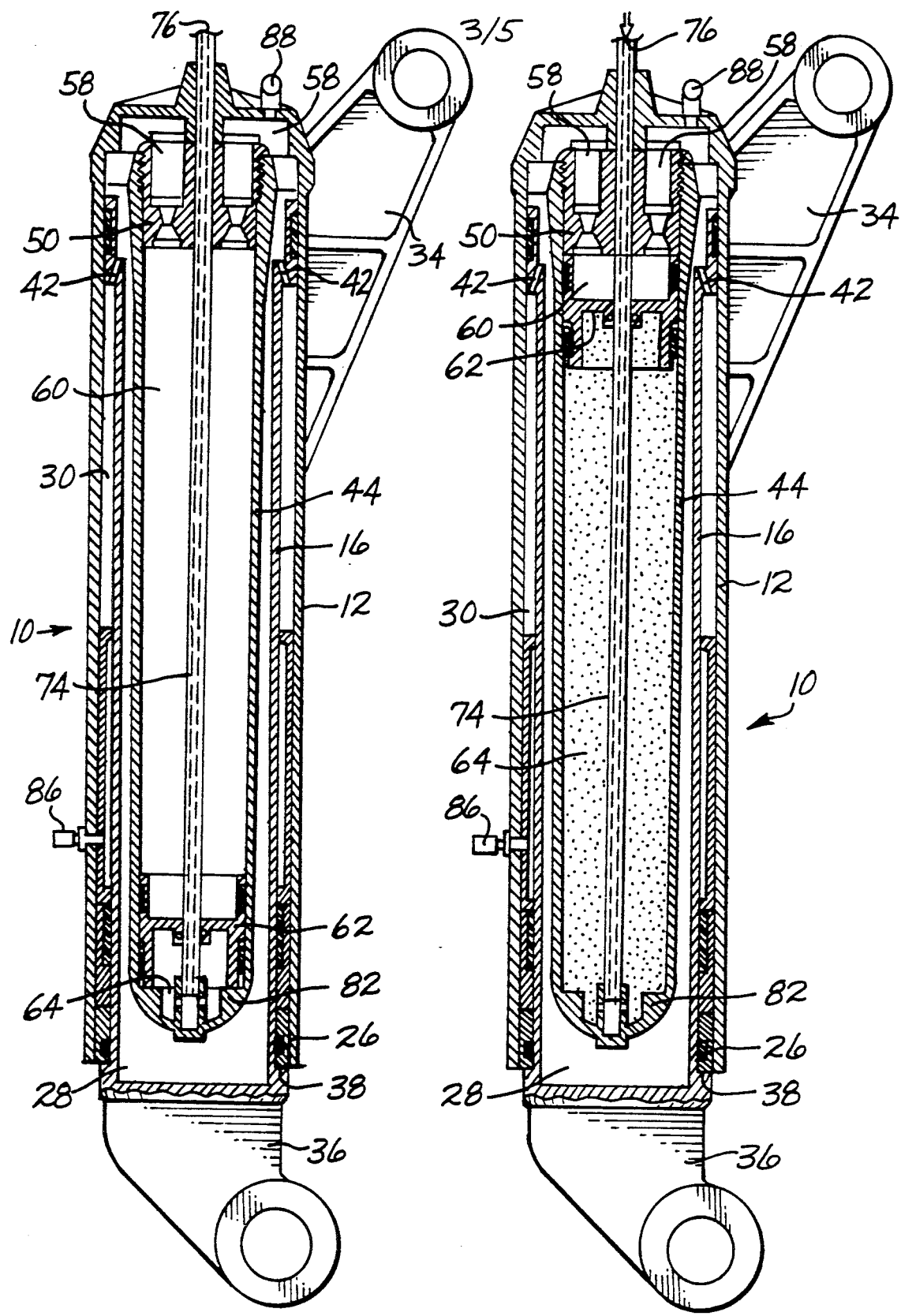
FIG. 2 is a similar sectional view showing the shock absorber in a completely collapsed position with all chambers empty and at ambient pressure.
FIG. 3 is a similar sectional view showing the gas chamber filled and pressurized to a predetermined initial level.

Referring first to FIG. 2, prior to servicing, all pressure in the chambers of the strut 10 are released to atmosphere. The load carried by the strut 10 will cause the cylinder 12 and piston 16 to fully collapse. In this position, the wiper bearing 26 of the cylinder 12 will rest on the stop shoulder 38 at the piston's flange end 36. In order to fully vent the strut's chambers to atmosphere, the gas port 76, and oil fill 86 and bleed 88 ports must be opened.

Referring to FIG. 3, working gas, preferably nitrogen, is introduced into the gas chamber 64 of the reservoir 44 through the gas port 76 and gas fill tube 74 Chamber 64 in FIG. 3 is shown with stippling to indicate the presence of working gas. As previously described, industrial gases are supplied on site in pressurized bottles or canisters. The pressure available in such bottles is typically limited to 1,800 to 2,400 psi. In FIG. 3, the separator piston 62 is shown elevated to its extreme upward position by the pressurized gas in chamber 64. Chamber 64 is filled with gas to a predetermined pressure. This pressure will be typically below the working static pressure of the strut 10 and is determined by what static volume of gas in chamber 64 is desired after further compression of the gas to static pressure.

Referring now to FIG. 4, oil is introduced through fill port 86, filling cylinder chamber 30, cylinder chamber 28, and then reservoir chamber 60, while air is exhausted through the air bleed valve 88. When all air has been expelled, valve 88 is closed. Oil is introduced at a rate which allows it to flow through ports 42 and then valves 58.

Referring now to FIG. 5, oil is continued to be introduced through port 86 under pressure until the pressure of the oil equals, and then exceeds, the pressure in gas chamber 64. As that predetermined gas pressure is exceeded, the separator piston will be moved downwardly, further compressing the gas, such that the pressure of the working gas and working liquid will approximately equalize Oil is continued to be introduced until a predetermined desired static pressure is reached. In preferred form, this pressure may be approximately 5,000 psi. At this point, the separator piston 62 should be in its correct static position. The cylinder 12 and piston 16, however, remain in a fully-collapsed position, as shown in FIG. 5, as the static pressure is approached. Desired static pressure will be determined by pascal's principle according to the diameter of the cylinder and area of the piston head. According to this principle, as previously discussed, the size (diameter) of the strut 10 must be increased to carry greater loads at a constant pressure The size (diameter) of the strut 10 may be reduced and still carry this increased load if the internal static pressure is correspondingly increased. As previously explained, the achievable static pressure for such a hydropneumatic strut has been limited by the gas pressures available on site in portable containers or bottles. The working liquid, preferably hydraulic oil, is available on site at any desired pressure, as determined by the necessary pump's capacity. Hydraulic power may easily be made available either from an aircraft system or from a standard servicing truck.

Referring finally to FIG. 6, the strut 10 is filled further with oil, at constant pressure, until the cylinder 12 and piston 16 extend to the correct static height. The height to which the strut is raised is indicated as $S_1$. The remaining stroke of the piston 16 within the cylinder 12, such as when all load is removed, is shown in FIG. 6 as $S_2$. The sum of the distances of $S_1$ and $S_2$ would be equal to the total stroke shown as A in FIGS. 1a and 1b.

The disclosed and illustrated embodiment and method represent the presently best known mode for carrying out the invention. Therefore, these are not to be construed as limitive, but rather exemplary. Many changes could be made in the use or method of this invention as necessary to serve a particular application without departing from the spirit and scope of this invention. Therefore, patent rights are to be determined by the limitations of the following claim or claims interpreted according to accepted doctrines of claim interpretation, including the doctrine of equivalents.

What is claimed is:

1. A hydropneumatic shock absorber, comprising:
   a cylinder;
   a piston slidably positioned in said cylinder, said piston and cylinder being configured as a telescopic suspension unit, said piston defining first and second variable volume chambers within said cylinder and filled with a working liquid, and said piston including a passage allowing said working liquid to flow between said first and second cylinder chambers;
   a fixed volume reservoir having an elongated casing and located within said first cylinder chamber, said reservoir including an interior movable barrier wall defining first and second separated variable volume reservoir chambers, said first reservoir chamber filled with working liquid and said second reservoir chamber filled with a working gas;
   said cylinder including a head portion partially defining said first cylinder chamber and supporting said elongated reservoir casing within said first cylinder chamber at one end of said casing;
   said casing being spaced inwardly from said cylinder and said piston a distance sufficient to isolate said casing from contact with said cylinder and said piston and any lateral loads placed on said shock absorber; and
   a plurality of flow-controlling damper valves communicating said first cylinder chamber with said first reservoir chamber, said damper valves being adjustably controlled externally of said cylinder, relative telescopic movement of said piston and said cylinder causing damped flow of said working liquid from said first cylinder chamber to said first reservoir chamber and causing responsive movement of said barrier wall to allow expansion of said first reservoir chamber and corresponding reduction of said second reservoir chamber, thereby compressing said working gas, and wherein lateral loads placed on said shock absorber are carried by said piston and cylinder and not by said reservoir casing.

* * * * *